United States Patent [19]

Hayashi

[11] Patent Number: 5,701,577
[45] Date of Patent: Dec. 23, 1997

[54] FORMING PROCESS UTILIZING LIQUID ABSORPTION BY LIQUID-ABSORBING SUBSTANCE, AND FORMED MATERIAL PRODUCED BY SAID PROCESS

[75] Inventor: Shinzo Hayashi, Nagoya, Japan

[73] Assignee: NGK Insulators, Ltd., Nagoya, Japan

[21] Appl. No.: 466,121

[22] Filed: Jun. 5, 1995

[30] Foreign Application Priority Data

Nov. 1, 1994 [JP] Japan ................................ 6-268965

[51] Int. Cl.$^6$ .................................................. B29C 39/00
[52] U.S. Cl. ..................... 428/546; 264/430; 264/434; 264/122; 264/349; 264/125
[58] Field of Search ........................ 264/122, 86, 87, 264/349, 430, 434, 125; 428/546

[56] References Cited

U.S. PATENT DOCUMENTS

| | | |
|---|---|---|
| 4,734,478 | 3/1988 | Tsubakimoto et al. . |
| 4,871,497 | 10/1989 | Natori et al. ............................ 264/86 |
| 4,962,172 | 10/1990 | Allen et al. . |
| 4,976,903 | 12/1990 | Matsuhisa et al. ...................... 264/86 |

FOREIGN PATENT DOCUMENTS

| | | |
|---|---|---|
| 1017477 | 9/1977 | Canada . |
| 0 601 725 A1 | 6/1994 | European Pat. Off. . |
| 1 469 806 | 10/1969 | Germany . |
| 21 27 908 B2 | 12/1971 | Germany . |
| 2452860 | 5/1976 | Germany ................................ 264/122 |
| 63-299907 | 12/1988 | Japan . |
| 64-24707 | 1/1989 | Japan . |
| 978 234 | 12/1964 | United Kingdom . |

*Primary Examiner*—Mathieu D. Vargot
*Attorney, Agent, or Firm*—Kubovcik & Kubovcik

[57] ABSTRACT

A forming process utilizing liquid absorption by a liquid-absorbing substance, includes preparing a liquid mixture containing at least one substance dispersible or soluble in the liquid mixture, a liquid capable of dispersing or dissolving the at least one substance, and a liquid-absorbing substance capable of absorbing the liquid by itself or when modified, and placing the liquid mixture in a mold and allowing the substance to absorb the liquid to obtain a formed material. In the forming process, the moldability is not influenced by the particle shape, particle diameter or particle size distribution of the at least one substance dispersible or soluble in the liquid, and the formed material obtained by said process has no internal strain and is homogeneous and elastic.

10 Claims, No Drawings

FORMING PROCESS UTILIZING LIQUID ABSORPTION BY LIQUID-ABSORBING SUBSTANCE, AND FORMED MATERIAL PRODUCED BY SAID PROCESS

BACKGROUND OF THE INVENTION

1. Field of the Invention

The present invention relates to a forming process utilizing liquid absorption by a liquid-absorbing substance, as well as to a formed material produced by said process.

2. Description of the Prior Art

Processes for powder forming (molding) include, in the case of ceramic molding, press forming, extrusion molding, injection molding, slip casting, etc. These forming processes, however, have problems. In press forming, the formed (molded) material inevitably has a simple shape. In extrusion molding, the molded (formed) material always has the same cross-sectional shape in the planes perpendicular to the extrusion direction. In injection molding, forming of a material having a complicated shape is possible, but a large amount of a resin or wax type binder is required, making the binder-removing step very complicated. Moreover in injection molding, a defect (weld line) tends to appear during molding and internal strain tends to remain in the molded material. In slip casting, a thick formed material is difficult to produce, shrinkage cavities appear, and segregation of coarse particles takes place.

Further in these forming processes, the moldability is greatly influenced by the particle shape, particle diameter and particle size distribution of the base material used, and, when a base material consisting of fine particles is used, forming (molding) is difficult.

Meanwhile, a process for forming a ceramic powder using a gel-form binder which is curable upon heating, is disclosed in Japanese Patent Application Kokai (Laid-Open) No. 24707/1989. Also, a process for forming a ceramic powder using a curable resin, is disclosed in Japanese Patent Application Kokai (Laid-Open) No. 299907/1988. In these processes, it is intended to improve the shape retainability of the formed material by the curing of gel-form binder or resin. These processes, however, have problems that the formed material has inferior releasability from the mold and a long time is taken for degreasing, i.e., removal of resin from formed material.

OBJECT AND SUMMARY OF THE INVENTION

The object of the present invention is to provide a formed material which is free from the above-mentioned problems of the prior art and which has no internal strain and is homogeneous.

According to the present invention, there is provided a forming process utilizing liquid absorption by a liquid-absorbing substance, which comprises preparing a liquid mixture containing
   at least one substance dispersible or soluble in the liquid mixture,
   a liquid capable of dispersing or dissolving the at least one substance, and
   a liquid-absorbing substance capable of absorbing the liquid by itself or when modified, and
allowing the liquid-absorbing substance to absorb the liquid to obtain a formed material.

In the present invention, the modification of the liquid-absorbing substance is conducted preferably by heating the liquid mixture or by irradiating the liquid mixture with an electromagnetic wave, to allow the liquid-absorbing substance to have an appropriate crosslinking degree. Also in the present invention, the liquid mixture is preferably subjected to defoaming before being subjected to forming.

According to the present invention, there is also provided a formed material with elasticity, which comprises a liquid mixture containing
   at least one substance dispersible or soluble in a liquid mixture,
   a liquid capable of dispersing or dissolving the at least one substance, and
   a liquid-absorbing substance capable of absorbing the liquid by itself or when modified,
wherein the liquid has been absorbed by the liquid-absorbing substance.

DETAILED DESCRIPTION OF THE INVENTION

The feature of the present invention lies in using a liquid-absorbing substance when a ceramic, metal or resin powder is subjected to forming. Further in the present invention, a liquid mixture as a forming material is preferably subjected to defoaming when a dense formed material is produced. A liquid mixture (e.g., a slurry, a dispersion or a solution) as a forming material, containing a base forming material component, a liquid component capable of dispersing or dissolving said base forming component and a liquid-absorbing substance component capable of absorbing said liquid component, is preferably subjected to defoaming and then is allowed to stand to allow the liquid-absorbing substance component to absorb the liquid component and give rise to curing, whereby a dense formed material with no foam is obtained. Hence in the forming process of the present invention, the moldability is not influenced by the particle shape, particle diameter and particle size distribution of said base forming material component to be dispersed or dissolved in said liquid component.

In the present invention, it is preferable to subject the liquid mixture as a forming material to defoaming. This defoaming is conducted to remove foam which may be present in the liquid mixture, because the liquid mixture of slurry, dispersion or solution form may contain foam entrapped during the stirring stage. When a liquid mixture containing foam is formed, there arise various problems, for example, (a) the resulting formed material contains pores and has a low hardness, (b) no homogeneous shrinkage takes place during drying, and (c) no dense formed material is obtained by drying. When a liquid mixture containing pores is used in ceramic forming, the resulting formed material contains pores, giving a final product (a sintered material) having defects. Defoaming is conducted, for example, by stirring under reduced pressure.

The other feature of the present invention lies in that as the liquid-absorbing substance there can be used a liquid-absorbing substance capable of absorbing the liquid component of the liquid mixture when modified in the liquid mixture. The desirable means for modifying the liquid-absorbing substance to endow the substance with liquid absorbability is to apply heat or an electromagnetic wave to the liquid mixture. The reasons are firstly that curing can be allowed to take place at any required time and secondly that the degree of curing can be controlled by the amount of heat or electromagnetic wave applied. When a liquid-absorbing substance capable of absorbing the liquid component by itself is used, the resulting liquid mixture begins curing right after its preparation; therefore, it may happen that the liquid mixture increases its viscosity during defoaming or casting, reducing the operability of defoaming or casting.

In the forming process of the present invention, since the curing mechanism is different from that of the conventional forming (molding) process using a binder, as mentioned below, homogeneous shrinkage takes place during drying and a dense formed material is obtained.

In the conventional process for forming and curing a powder, particles or the like using a binder, the binder present between particles constitutes the skeleton of the resulting formed material; therefore, the binder hinders the shrinkage of the formed material when the water in the formed material is removed by drying. Meanwhile, in the formed material according to the present invention, the liquid-absorbing substance component having absorbed the liquid component (e.g. water) shrinks; accordingly, the shrinkage takes place homogeneously as compared with the case using a binder, and the resulting formed material comes to have a high density.

In the degreasing step of the conventional injection-molding process, the removal of the organic component (binder) is conducted by the oozing of said component from the formed material and subsequent decomposition of said component. In this case, rapid heating of the formed material produces defects therein. Therefore, the binder removal took a very long time. In contrast, in the present forming process, the removal of liquid component from the formed material is conducted based on the mechanism of ordinary liquid vaporization. Therefore, drying of the formed material for liquid component removal is complete in a short time even when the formed material is a thick material, as compared with the drying of a conventional formed material (e.g., an injection-molded material) containing a large amount of a binder. When a conventional formed material using a water-soluble binder is dried, the segregation of binder on the surface of formed the material may occur, producing defects in the formed material. In contrast, in the present forming process, the liquid-absorbing substance makes substantially no movement with water during drying and consequently gives rise to substantially no segregation and produces no defects in the resulting formed material.

As described above, the present forming process and the conventional forming process using a binder differ in the mechanisms of curing. In the present forming process, when defoaming is conducted, the resulting formed material has greatly improved properties. In the conventional forming process, since the binder itself constitutes the skeleton of the resulting formed material, reduction in hardness in the formed material is small even when air is entrapped inside the formed material. Meanwhile, in the present forming process, since no binder is used, reduction in hardness in the formed material is large when air is entrapped inside the formed material. Moreover, in the present forming process, when air is present inside the formed material, shrinkage during drying is hindered, making it impossible to obtain a formed material of homogeneity and high density.

In the present forming process, the substance dispersible in the liquid component or in the liquid mixture may be any of (a) a ceramic, metal or resin powder, (b) ceramic, metal or resin whiskers, (c) a ceramic, metal or resin fiber and (d) a metal or resin emulsion. A liquid mixture containing said dispersible substance, i.e., a dispersion, can be subjected to curing and forming. The liquid mixture may also take a solution form, which can also be subjected to curing and forming. Thereby, the resulting formed material containing a ceramic, a metal or the like can have excellent properties.

Generally in ceramic or metal forming, raw materials of fine particle form are used and small amounts of additives are added in order to allow the resulting formed material to have improved mechanical, electrical and magnetic properties. Such raw materials can be produced, for example, by a sol-gel process.

The sol-gel process is a process for producing a powder from a solution and can produce a very fine and homogeneous powdery raw material capable of providing a ceramic or metal formed material having improved properties. The raw material produced by the sol-gel process, however, is very difficult to mold and the sol-gel process requires a complicated procedure; therefore, the practical application of the sol-gel process is difficult.

Meanwhile in the present forming process, the raw materials can be cured and formed not only in a dispersion state but also in a solution state. Therefore, the formed material is as homogeneous as a solution. By removing the volatile component from the thus-obtained formed material, a dried formed material of homogeneity containing very fine particles can be obtained. Consequently, the formed material and the dried formed material have significantly improved properties and can have mechanical, electrical and magnetic properties as desired.

The forming process of the present invention needs no large external force during forming, unlike in the press forming, extrusion molding, injection molding, etc., and accordingly the formed material obtained has no internal strain.

The liquid-absorbing substance usable in the present invention is preferably a water-absorbing resin, for example. The water-absorbing resin is a resin which can absorb water several tens times to several thousands times the weight of the resin and can thereby swell. It is a resin ordinarily used in sanitary goods, paper diapers, soil water-holding agents, etc. As the water-absorbing resin, there can be cited, for example, a polyacrylic acid salt, a starch-polyacrylic acid salt graft polymer, an acrylic acid-vinyl alcohol copolymer, a crosslinked polyethylene oxide, a polyvinyl alcohol-maleic acid ester copolymer, an isobutylenemaleic anhydride copolymer and a crosslinked carboxymethyl cellulose.

In the present forming process, a water-absorbing resin itself may be used in the liquid mixture of the present invention; however, in view of the rapid water absorption speed of said resin and the operability of stirring and casting of said liquid mixture, it is preferable to subject at least one monomer or polymer to a reaction (e.g., polymerization) in said liquid mixture to form a water-absorbing resin. A water-soluble polymer or monomer (e.g., acrylic acid or its salt, polyacrylic acid salt, polyvinyl alcohol, starch, polyethylene oxide, isobutylene-maleic anhydride copolymer or starch-polyacrylic acid salt graft polymer) is added to said liquid mixture and is subjected to a polymerization reaction or a crosslinking reaction using a crosslinking agent, in said reaction mixture to form a water-absorbing resin.

In order to initiate or promote the polymerization reaction or the crosslinking reaction, it is desirable to apply heat or an electromagnetic wave (e.g. γ-rays, ultra-violet rays, X rays, radiation, visible light, infrared rays or electron beam). Since the liquid absorbability of the water-absorbing resin differs depending upon the polymerization degree (or crosslinking degree) of said resin, it is necessary to control the temperature and time of heating or the kind, wavelength and exposure of electromagnetic wave used when a formed material of higher hardness is desired. The heating conditions or the application conditions of the electromagnetic wave need appropriately be decided depending upon the kind of the water-absorbing resin (or water-absorbing resin precursor) used. Thus, the elasticity of the resulting formed material can be controlled as desired. Needless to say, curing is possible without using any heat or electromagnetic wave. For example, when a highly reactive polymer and a crosslinking agent are used, simply by allowing the resulting liquid mixture to stand in a mold, curing can be allowed to take place in several minutes to several tens of hours to give a formed material although the formed material has a hardness lower than when heat or the like is applied.

As the crosslinking agent, there can be cited, for example, amine compounds such as ethanolamine, ethylenediamine and the like; imine compounds such as polyethyleneimine and the like; glycidyl ether compounds such as glycerol polyglycidyl ether, polypropylene glycol diglycidyl ether, ethylene glycol diglycidyl ether, polyethylene glycol diglycidyl ether and the like; arylic acid derivatives such as 2-hydroxyethyl acrylate, 2-hydroxypropyl acrylate, polypropylene glycol diacrylate, polyethylene glycol dimethacrylate, glycerine dimethacrylate and the like; and haloepoxyalkanes such as epichlorohydrin, epibromohydrin, α-methylepichlorohydrin and the like.

In the present forming process, use of a small amount of the water-absorbing resin allows for absorption of a large amount of water. Consequently, even when the liquid mixture contains a very large amount of the liquid component such as the dispersing substance or the dissolving substance, forming is possible. Conversely, when the liquid mixture contains a small amount of the liquid component, the amount of the water-absorbing resin may be small.

When the forming process of the present invention is applied to a ceramic, for example, said ceramic and a small amount of a water-absorbing resin are wet-ground with water, and the resulting liquid mixture itself is cast and formed. Thus, forming is very easy. The resulting formed material, which contains a small amount of water, can be dried for water removal by an ordinary drying means.

In the present forming process, as the substance dispersible in the liquid mixture, there can be cited, as mentioned previously, (a) a ceramic, metal or resin powder, (b) ceramic, metal or resin whiskers, (c) a ceramic, metal or resin fiber and (d) a metal or resin emulsion. Therefore, a substance in any form of powder, whiskers, fiber and emulsion can be formed in the present process.

As the substance soluble in the liquid mixture, there can be cited metal compounds such as metal carbonate, metal nitrate, metal acetate, metal alkoxide and the like.

In the present forming process, the liquid component capable of dispersing or dissolving the substance is not particularly restricted but is preferably water or a lower alcohol (e.g., methanol or ethanol).

In the present forming process, the proportions of the substance dispersible or soluble in the liquid mixture, the liquid, and the liquid-absorbing substance used are not specified because the proportions vary depending upon the kinds of the substance and the liquid used and the properties required for the formed material to be obtained.

In the formed material obtained by the present process, the particles are dispersed homogeneously. Therefore, when the formed material is dried, ideal shrinkage takes place and a dried formed material is obtained which is free from pores, is very dense and has no internal defect or strain. The dried formed material has a high density and the liquid-absorbing resin acts as a binder in said material; therefore, the formed material is very hard. The liquid-absorbing resin (acting as a binder) can easily be removed unlike the case of the injection-molded material containing a large amount of a binder.

The formed material obtained by the present process has elasticity but shows no plasticity as exhibited by the formed material obtained by extrusion molding or the like. Consequently, the present formed material is easy to release from the mold. Further, in the present forming process, it is possible to produce a formed material having an overhung shape. Furthermore, transferability from the mold is good in the present forming process.

The formed material obtained by the present process using a ceramic or a metal, is then dried, calcinated and fired (when necessary, subjected to pressing by hydrostatic pressure before firing), whereby a desired sintered material can be obtained.

The present invention is hereinafter described more specifically by way of Examples. However, the present invention is not restricted to these Examples.

EXAMPLE 1

| Alumina | 70% by weight |
|---|---|
| Water | 30% by weight |
| Dispersant (deflocculant) | 1% by weight based on above |

A slurry having the above formulation was prepared. Thereto was added an aqueous solution of an isobutylene-maleic anhydride copolymer (molecular weight=160,000), in an amount of 5% by weight in terms of solid content, and the mixture was stirred with a stirrer. Thereto was added an aqueous solution containing 30% by weight of a polyethyleneimine, in an amount of 10% by weight (polyethyleneimine) based on 100% by weight of isobutylene-maleic anhydride copolymer. The mixture was stirred with a stirrer. The resulting slurry was placed in a defoaming vessel (VA-C-03, a product of Shinei Kiko) and subjected to defoaming under reduced pressure of 40 Torr for 30 minutes. The slurry after defoaming was placed in a cylindrical vessel (a mold) of 50 mm (diameter)×100 mm and allowed to stand at room temperature. Two days later, a formed material was taken out from the mold. The formed material had an elasticity as possessed by a rubber, and its release from the mold was easy and no deposit remained on the mold.

EXAMPLE 2

Polymerization and forming were conducted in the same manner as in Example 1 except that the curing temperature was changed to 70° C. In 3 hours, the slurry was cured and formed, and release from the mold became possible. The formed material had an elasticity as possessed by a rubber, and its release from the mold was easy and no deposit remained on the mold. The elasticity of the formed material was higher than that of Example 1.

EXAMPLE 3

| Iron powder | 75% by weight |
|---|---|
| Water | 25% by weight |

A metal powder slurry having the above formulation was prepared. Thereto was added an aqueous solution of an isobutylene-maleic anhydride copolymer (molecular weight=160,000) in an amount of 5% by weight in terms of solid content. The mixture was stirred with a stirrer. The resulting slurry was subjected to defoaming in the same manner as in Example 1. The slurry after defoaming was subjected to the same curing and forming in the same manner as in Example 2. As a result, a formed material having the same elasticity as in Example 2 was produced.

EXAMPLE 4

To a slurry prepared in the same manner as in Example 1 was added an aqueous solution containing 20% by weight of hydroxyethyl methacrylate, in an amount of 10% by weight in terms of solid content. The mixture was stirred with a stirrer and placed in a stainless steel vessel in the form of a 1-mm thick sheet. The sheet was irradiated with a γ-ray emitted from cobalt 60.

As a result, a ceramic formed material of sheet form was produced. The sheet had flexibility and could be bent easily. Moreover, it could be cut easily with a knife.

As described above, when, in producing a formed material from a ceramic, metal or resin powder, a liquid-absorbing substance is used as one forming material and preferably the forming slurry prepared is defoamed, according to the present process, the moldability is not influenced by the particle shape, particle diameter or particle size distribution of said powder and there can be produced a formed material which has no internal strain and is homogeneous and elastic.

What is claimed is:

1. A process for molding a ceramic or metal powder utilizing liquid absorption by a liquid-absorbing substance, said process comprising the steps of:

preparing a liquid mixture containing
      at least one metal or ceramic powder dispersible in the liquid mixture,
      a liquid capable of dispersing the at least one powder, and
      a liquid-absorbing substance capable of absorbing the liquid by itself or when modified;

placing the liquid mixture in a mold; and allowing the liquid-absorbing substance to absorb the liquid to obtain a molded material.

2. A process according to claim 1, wherein the modification of the liquid-absorbing substance is conducted by heating the liquid mixture or irradiating the liquid mixture with an electromagnetic wave.

3. A process according to claim 1, wherein the liquid mixture is subjected to defoaming prior to being placed in a mold.

4. A process according to claim 1, wherein the liquid is water or a lower alcohol.

5. A process according to claim 1, wherein the liquid-absorbing substance is a water-absorbing resin.

6. A process according to of claim 1, wherein the liquid-absorbing substance is a water-absorbing resin obtained by polymerizing at least one polymer or monomer in the liquid mixture.

7. A molded ceramic or metal powder material having elasticity comprising a liquid mixture containing at least one metal or ceramic powder dispersible in the liquid mixture, a liquid capable of dispersing the at least one powder, and a liquid-absorbing substance capable of absorbing the liquid by itself or when modified, wherein the liquid has been absorbed by the liquid-absorbing substance.

8. A material according to claim 7, wherein the liquid is water or a lower alcohol.

9. A material according to claim 7, wherein the liquid-absorbing substance is a water-absorbing resin.

10. A material according to claim 7, wherein the liquid-absorbing substance is a water-absorbing resin obtained by polymerizing at least one polymer or monomer in the liquid mixture.

* * * * *